US012253309B2

(12) United States Patent
Kaczinski

(10) Patent No.: US 12,253,309 B2
(45) Date of Patent: *Mar. 18, 2025

(54) ROTARY KILN AND METHOD FOR BURNING CARBONATE-CONTAINING MATERIAL, IN PARTICULAR LIMESTONE OR DOLOMITE

(71) Applicant: S.A. Lhoist Recherche et Développement, Ottignies-Louvain-la-neuve (BE)

(72) Inventor: Carsten Kaczinski, Dortmund (DE)

(73) Assignee: S.A. Lhoist Recherche et Développement, Ottignies-Louvain-la-Neuve (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/280,343

(22) PCT Filed: Mar. 7, 2022

(86) PCT No.: PCT/EP2022/055696
§ 371 (c)(1),
(2) Date: Sep. 5, 2023

(87) PCT Pub. No.: WO2022/184936
PCT Pub. Date: Sep. 9, 2022

(65) Prior Publication Data
US 2024/0077257 A1 Mar. 7, 2024

(30) Foreign Application Priority Data
Mar. 5, 2021 (EP) .................................... 21161139

(51) Int. Cl.
*F27B 7/16* (2006.01)
*C04B 2/10* (2006.01)

(52) U.S. Cl.
CPC ............... *F27B 7/162* (2013.01); *C04B 2/10* (2013.01); *F27B 2007/165* (2013.01); *F27M 2003/03* (2013.01)

(58) Field of Classification Search
USPC .................................................. 432/103, 118
See application file for complete search history.

(56) References Cited

U.S. PATENT DOCUMENTS 1,544,504 A * 6/1925 Tomlinson ............... F27B 7/162
432/118
2,506,739 A * 5/1950 Raypholtz ............... E01C 19/05
34/137

(Continued)

FOREIGN PATENT DOCUMENTS

CN 209027271 U * 6/2019
DE 400236 C 8/1924

(Continued)

*Primary Examiner* — Ko-Wei Lin
(74) *Attorney, Agent, or Firm* — The Webb Law Firm

(57) ABSTRACT

The present invention relates to a rotary kiln for burning carbonate-containing material, in particular limestone or dolomite, including a rotary tube with an inlet end for the feeding of the material to be burned and an outlet end for the discharging of the burned material, the rotary tube having an inlet zone at its inlet end and an outlet zone at its outlet end wherein a preheating zone and a combustion zone are arranged between the inlet zone and outlet zone, the rotary kiln being characterized according to the invention in that in the inlet zone of the rotary tube at least one projection is provided, the at least one projection having at least one sliding surface inclined to the longitudinal axis of the rotary tube for conveying the material to be burned from the inlet zone into the preheating zone. The present invention further relates to a method for burning carbonate-containing material, in particular limestone or dolomite.

20 Claims, 10 Drawing Sheets

(56) References Cited

U.S. PATENT DOCUMENTS

| | | | | |
|---|---|---|---|---|
| 2,939,693 | A * | 6/1960 | Old | F27B 7/162 432/118 |
| 3,124,338 | A * | 3/1964 | Harris | F27B 7/162 432/118 |
| 3,758,089 | A * | 9/1973 | Kocks | C22B 1/14 266/144 |
| 4,038,021 | A * | 7/1977 | Benson | F26B 11/0445 432/118 |
| 4,136,965 | A * | 1/1979 | Sunnergren | F27B 7/162 432/118 |
| 4,307,520 | A * | 12/1981 | Lutz | F26B 11/0463 432/118 |
| 4,338,732 | A * | 7/1982 | Coxhill | E01C 19/1036 432/118 |
| 4,459,921 | A * | 7/1984 | Unger | F23H 3/02 432/103 |
| 4,475,886 | A | 10/1984 | Tyler | |
| 4,813,784 | A * | 3/1989 | Musil | E01C 19/1036 432/117 |
| 5,083,382 | A * | 1/1992 | Brashears | F26B 11/0463 432/118 |
| 5,203,693 | A * | 4/1993 | Swanson | F26B 11/0477 432/118 |
| 5,302,118 | A * | 4/1994 | Renegar | F23G 7/14 432/106 |
| 5,380,082 | A * | 1/1995 | Milstead | B01F 27/0726 432/118 |
| 5,380,084 | A * | 1/1995 | Milstead | B01F 27/112 432/118 |
| 5,463,819 | A * | 11/1995 | Komori | F26B 11/0477 432/118 |
| 5,480,226 | A * | 1/1996 | Milstead | F26B 11/0477 366/7 |
| 5,515,620 | A * | 5/1996 | Butler | F26B 11/0477 432/118 |
| 5,623,883 | A * | 4/1997 | Davidson | F27B 7/162 432/119 |
| 5,873,714 | A | 2/1999 | Mosci | |
| 5,975,752 | A * | 11/1999 | Doerksen | F27B 7/162 432/118 |
| 6,164,809 | A * | 12/2000 | Hawkins | F26B 11/028 432/103 |
| 6,183,244 | B1 * | 2/2001 | Doumet | F27B 7/42 432/106 |
| 7,204,636 | B2 * | 4/2007 | Didion | B01F 29/63 366/147 |
| 7,452,203 | B2 * | 11/2008 | Laux | F27B 7/36 432/103 |
| 7,811,083 | B2 * | 10/2010 | Bohringer | F27B 7/16 432/118 |
| 8,172,448 | B1 * | 5/2012 | Hudman | E01C 19/1027 432/118 |
| 9,080,813 | B1 * | 7/2015 | Deckebach | F27B 7/20 |
| 2003/0165788 | A1 * | 9/2003 | McCarty | F27B 7/33 432/103 |
| 2004/0118006 | A1 * | 6/2004 | Jerzembski | F27B 7/34 34/201 |
| 2007/0144112 | A1 * | 6/2007 | Fumalle | E02D 29/14 52/784.11 |
| 2008/0070178 | A1 * | 3/2008 | Bohringer | F27B 7/16 432/118 |
| 2016/0084574 | A1 * | 3/2016 | Giebelhausen | F27B 7/16 432/118 |
| 2020/0049407 | A1 * | 2/2020 | Son | F27B 7/16 |

FOREIGN PATENT DOCUMENTS

| | | | |
|---|---|---|---|
| DE | 423492 C | 1/1926 | |
| DE | 7029355 U | 8/1972 | |
| DE | 2325781 A1 | 11/1974 | |
| EP | 1903292 A2 | 3/2008 | |
| EP | 3444549 A1 * | 2/2019 | F26B 11/0409 |
| FR | 443783 A | 10/1912 | |
| JP | 2008122043 A | 5/2008 | |

* cited by examiner

ROTARY KILN AND METHOD FOR BURNING CARBONATE-CONTAINING MATERIAL, IN PARTICULAR LIMESTONE OR DOLOMITE

CROSS-REFERENCE TO RELATED APPLICATIONS

This application is the United States national phase of International Application No. PCT/EP2022/055696 filed Mar. 7, 2022, and claims priority to European Patent Application No. 21161139.7 filed Mar. 5, 2021, the disclosures of which are hereby incorporated by reference in their entireties.

BACKGROUND OF THE INVENTION

Field of the Invention

The invention relates to a rotary kiln for burning carbonate-containing material, in particular limestone or dolomite, comprising a rotary tube having an inlet end for the feeding of the material to be burned and an outlet end for the discharging of the burned material, the rotary tube having an inlet zone at its inlet end and an outlet zone at its outlet end, a preheating zone and a combustion zone being arranged between the inlet zone and outlet zone. Furthermore, the present invention relates to a method for burning carbonate-containing material, in particular limestone and dolomite, in such a rotary kiln.

Description of Related Art

Rotary kilns for burning carbonate-containing material have been known from the prior art for decades and have proven themselves as an efficient and reliable type of kiln for continuously calcining various types of materials. Published prior art can be found, for example, in EP 1 903 292 A2, JP 2008/122043 A and U.S. Pat. No. 5,975,752.

A central component of a rotary kiln is a long cylindrical rotary tube, which is typically inclined at about 2 to 7% with respect to the horizontal. The rotary tube rotates slowly at 0.5 to 1.5 rpm around its axis, and the material to be burned which is introduced at its inlet end by means of a screw conveyor or the like slowly moves by gravitational force through the rotary cylinder in the direction of a flame generated by a burner in the region of the outlet end. The kiln is typically filled with the material to be burned up to about 8 to 20% of the kiln diameter.

In order to operate the kiln efficiently, high throughput rates are always sought, while at the same time it must be ensured that the calcination of the material to be burned is complete and that all the carbon dioxide is removed from the material. At the same time, it is crucial that sintering of the material to be burned, which then occurs when the material to be burned is exposed to temperatures that are above or in the region of its sintering temperature, is prevented.

A particular problem can arise in the region of the inlet zone of the rotary tube, since the low inclination of the rotary tube to the horizontal combined with the constant rotary movement can cause the material to be burned to move backward. While such a backward movement in the combustion or outlet zone of the rotary kiln is unproblematic, it can lead, among other things, to blockage of the feed mechanism in the region of the inlet zone. In particular, this applies in the case of buckets provided for the supply of smaller amounts of material (bucket conveyor). As a result, an efficient uniform kiln operation with high material throughput is impaired as a whole. A further consequence of the backward movement is that the material to be burned is rubbed against the wear rings of the inlet seal, thereby making it possible for dust to be released into the environment.

SUMMARY OF THE INVENTION

It is therefore the object of the present invention to provide a rotary kiln for burning carbonate-containing material, in particular limestone or dolomite, of the type mentioned at the outset, which ensures a high material throughput and a high quality of the burned material and at the same time is of simple design. In particular, a backward movement of the material to be burned in the inlet zone is to be reliably minimized.

According to a first aspect of the present invention, the aforementioned problem is achieved with a rotary kiln as described herein in that at least one projection is provided in the inlet zone of the rotary tube, the at least one projection having at least one inclined sliding surface for conveying the material to be burned from the inlet zone into the combustion zone.

The rotary kiln according to the invention is characterized by reliable operation with a high, uniform material throughput. In particular, the provision of the at least one projection with the at least one inclined sliding surface in the inlet zone of the rotary tube ensures that the material to be burned introduced into the rotary tube via the inlet end is transported or conveyed quickly from the inlet zone into the burning zone. This takes advantage of the fact that the material to be burned comes to rest on the at least one sliding surface of the material bed due to the rotation of the at least one projection through the material bed and, due to the particular inclination of the sliding surface, slides quickly in the direction of the preheating zone by gravitational force. It goes without saying that the direction of rotation of the rotary tube and the alignment of the sliding surface in the circumferential direction of the rotary tube must be adapted accordingly to one another.

Since, with the solution according to the invention, a constant transport of the material to be burned from the inlet zone to the burning zone is ensured, the material to be burned is burned there continuously and uniformly, the risk of overburning or sintering being minimized. At the same time, the formation of dust is considerably reduced, since grinding of the material to be burned against the wear rings as a result of a backward movement of the material in the inlet zone is effectively prevented.

According to the invention, the at least one projection has at least one sliding surface inclined to the longitudinal axis of the rotary tube for conveying the material to be burned from the inlet zone into the burning zone. In order to keep the design of the at least one projection simple and thus to keep production costs low, the at least one projection can preferably have exactly one inclined sliding surface. It understood that, depending on the specific application and the material to be burned that is used, a plurality of sliding surfaces of the same or different inclination may also be provided.

Different angles of inclination may be provided for the at least one sliding surface. According to an advantageous embodiment of the invention, the at least one sliding surface of the at least one projection has an inclination to the longitudinal axis of the rotary tube of 15° to 70°, in particular of 25° to 65°, especially of 35° to 55°. Particularly good results have been achieved at an angle of inclination between 40° and 50°, especially around 45°.

Due to the high temperatures already prevailing in the inlet zone of the rotary tube, in particular in the vicinity of the burning zone, it is preferred that the at least one projection contains a refractory material. These can be various high-temperature resistant materials, as are known per se from the prior art. Concrete, in particular refractory concrete, proves to be particularly suitable.

In numerous experiments by the applicant, different geometries have been found to be suitable for the at least one projection. Prismatic geometries, in particular in the form of a straight prism with a polygonal base area, are preferred. A triangular base surface is particularly preferred, especially in the form of a right triangle, in which the at least one sliding surface is formed by the hypotenuse of the right triangle.

The height of the at least one additional projection, i.e. the extension in the radial direction with respect to the cylindrical rotary tube, is important for a particularly good effectiveness in relation to the conveyance of the material to be burned from the inlet zone in the direction of the burning zone. According to an advantageous embodiment of the invention, the at least one projection has a height extending in the radial direction of the rotary tube of 100 mm to 500 mm, in particular of 140 mm to 400 mm, preferably of 160 mm to 300 mm and particularly preferably of 180 mm to 250 mm. This ensures that a sufficient amount of material rests on the at least one sliding surface of the at least one projection and subsequently slides in the direction of the burning zone due to the inclination of the sliding surface.

Furthermore, according to an advantageous embodiment of the invention, it is provided that the at least one projection has a length extending substantially parallel to the longitudinal axis of the rotary tube of 100 mm to 2000 mm, in particular 150 mm to 1000 mm, preferably 300 mm to 500 mm and very particularly preferably 350 mm to 450 mm.

The at least one projection can be permanently connected to the inner lining of the rotary tube. However, in order to ensure a secure and durable connection between the inner lining of the rotary tube and the projection, it is provided according to a further advantageous embodiment of the invention that the at least one projection is attached by means of anchoring, in particular metallic anchoring, to the inner lining of the rotary tube.

According to a particularly advantageous embodiment of the invention, it is provided that a plurality of projections are provided in the inlet zone of the rotary tube, the projections being arranged in a row as a group such that the respective sliding surfaces of the projections form a common sliding surface for the material to be burned. This results in a particularly effective conveyance of the material to be burned from the inlet zone of the rotary tube to its burning zone. The individual projections can thereby be lined up end to end, i.e. essentially without gaps. It is also possible to line them together with a gap in between, for example to allow for thermal expansion, but the gap width must be dimensioned such that the characteristic of a common sliding surface is maintained.

Because a common sliding surface is provided by a plurality of projections lined up as a group, on the one hand a particularly long sliding surface can be provided, which extends practically along the entire extent of the inlet zone. On the other hand, the assembly of a plurality of projections is facilitated compared to a highly extended projection. At the same time, in the event of damage to, for example, an individual projection from the group of projections arranged in a row, these can be specifically replaced without having to dismantle the overall structure.

The group of projections arranged in a row can comprise a varying number of projections. In particular, the common sliding surface for the material to be burned can be formed by 3 to 9 projections, in particular by 4 to 8 projections, especially by 5 to 7 projections and very particularly preferably by 6 projections.

It is particularly preferred in terms of the simplest possible construction of the rotary kiln according to the invention that the plurality of projections are formed substantially identically to one another, such that a common sliding surface is formed with an essentially constant slope or sliding angle with respect to the longitudinal axis of the rotary tube. Further, it can be provided that the plurality of projections are arranged in a row in a stepped form as a group along the inlet zone.

A further improvement in the conveyance of the material to be burned through the inlet zone of the rotary tube is achieved by arranging 2 to 8, in particular 3 to 7, especially 4 to 6 and very particularly preferably 5 projections or groups of projections arranged in a row over the circumference of the rotary tube. The appropriate number of projections is selected in particular as a function of the diameter of the rotary tube.

According to a further particularly advantageous embodiment of the invention, it is provided that the rotary tube has at least one further projection, preferably a plurality of further projections, in the region of the preheating zone for more rapid passage of the material to be burned through the preheating zone and for reducing the formation of dust. As a result, the material to be burned, which is now transported more quickly through the inlet zone, is also transported quickly and with improved mixing through the burning zone, so that material build-up does not occur, particularly in the region of the transition from the inlet zone to the preheating zone, which further improves material throughput and product quality.

According to an advantageous further development of the foregoing, it can also be provided that a plurality of further projections are provided in the region of the preheating zone, the further projections being arranged as groups substantially parallel to the longitudinal axis of the rotary tube. It is particularly preferred that further projections arranged adjacent to one another in the circumferential direction, each belonging to adjacent groups of further projections, are arranged offset from one another in the longitudinal direction of the rotary tube such that spiral-shaped transport paths are formed for the material to be burned along the preheating zone. This can reduce the dwell time of the material in the rotary kiln and increase throughput while maintaining product quality. Preferably, the number of groups of further projections arranged one behind the other in the longitudinal direction of the rotary tube is adapted to the number of groups of projections arranged in a row in the inlet zone.

The other projections can have different geometries. Prismatic geometries are again particularly preferred. In investigations carried out by the applicant, trapezoidal structures have proved to be particularly suitable, specifically a straight prism with the base of an isosceles trapezium, with the trapezoidal surfaces arranged perpendicular to the inner kiln wall. In order to ensure sufficient heat resistance, it can be provided that the further projection contain concrete, in particular refractory concrete, which in turn is known from the prior art. Specifically, the trapezoidal contour can be formed by a formwork made of a metallic material, which has corresponding openings into which concrete can be poured. Preferably, the further projections have a height of between 100 mm and 300 mm, preferably of approximately 200 mm, and a length in the longitudinal direction of the rotary tube of also between 100 mm and 400 mm, preferably of approximately 400 mm. The trapezoidal base of the trapezoidal prism also has a length of between 100 mm and 400 mm, preferably of approximately 400 mm, while the upper edge parallel to the trapezoidal base has a length of between 50 mm and 150 mm, preferably of approximately 100 mm.

According to a further particularly advantageous embodiment of the invention, it can furthermore be provided that the rotary tube has at least one additional projection, preferably a group of additional projections, in the region of the outlet zone, to prevent the formation of clusters in the burned material. This results in particularly uniform cooling of the entire burned material in the region of the outlet end, which effectively improves kiln performance and the quality of the burned material, and also protects downstream plant components, such as grate coolers, from overheating, which in turn leads to an extended service life of the entire kiln.

Preferably, a plurality of additional projections are provided in the region of the outlet zone, the additional projections being arranged as groups in the circumferential direction of the rotary tube, preferably offset from one another in the longitudinal direction of the rotary tube, in order to maximize material mixing and thus the uniformity of the cooling effect. A plurality of groups of additional projections are in turn preferably provided in the longitudinal direction of the rotary tube. Preferably, furthermore, the number of additional projections arranged over the inner circumference of the rotary tube is matched to the number of further projections arranged over the circumference of the rotary tube in the preheating zone, preferably identical.

The additional projections can have different geometries. Particularly preferred is the geometry of a truncated pyramid with the base of an isosceles acute triangle with, for stability reasons, preferably a blunted apex, the blunted acute angle leading in the direction of rotation of the rotary tube and thus plowing, as it were, through the burned material. In order to ensure sufficient heat resistance, it can be provided that the additional projections contain concrete, in particular refractory concrete, which in turn is known from the prior art. Preferably, the additional projections have a height of between 100 mm and 300 mm, preferably of approximately 200 mm, and a length in the circumferential direction of the rotary tube (height of the isosceles triangular base surface of the truncated pyramid) of between 300 mm and 500 mm, preferably of approximately 400 mm. The width of the side of the triangle opposite the acute angle of the isosceles triangular base surface is between 50 mm and 150 mm, preferably approximately 300 mm.

According to a further aspect of the present invention, the object mentioned at the outset is achieved with a method for burning carbonate-containing material, in particular limestone or dolomite, which comprises the following steps:

introducing the carbonate-containing material into the rotary tube of a rotary kiln according to any one of claims 1 to 14, burning the carbonate-containing material, the carbonate-containing material moving through the rotary tube from the inlet zone and the burning zone to the outlet zone, the rotary tube rotating in a direction of rotation, conveying the carbonate-containing material from the inlet zone into the burning zone, in that the carbonate-containing material rests at least partially on the sliding surface of the at least one projection, which is inclined to the longitudinal axis of the rotary tube, and slides, driven by gravity, in the direction of the preheating zone.

The advantages mentioned above apply accordingly to the method.

In particular, an efficient burning process is proposed, which is characterized by a high material throughput through the rotary kiln, a uniformly high product quality for the burned material, and by being easy to carry out. In particular, a backward movement of the material to be burned in the inlet zone of the rotary tube and thus a possible blockage or clogging is effectively avoided.

BRIEF DESCRIPTION OF THE DRAWINGS

The invention is explained in more detail below in reference to a drawing depicting an exemplary embodiment. Shown are.

DESCRIPTION OF THE INVENTION

Figure 1A:
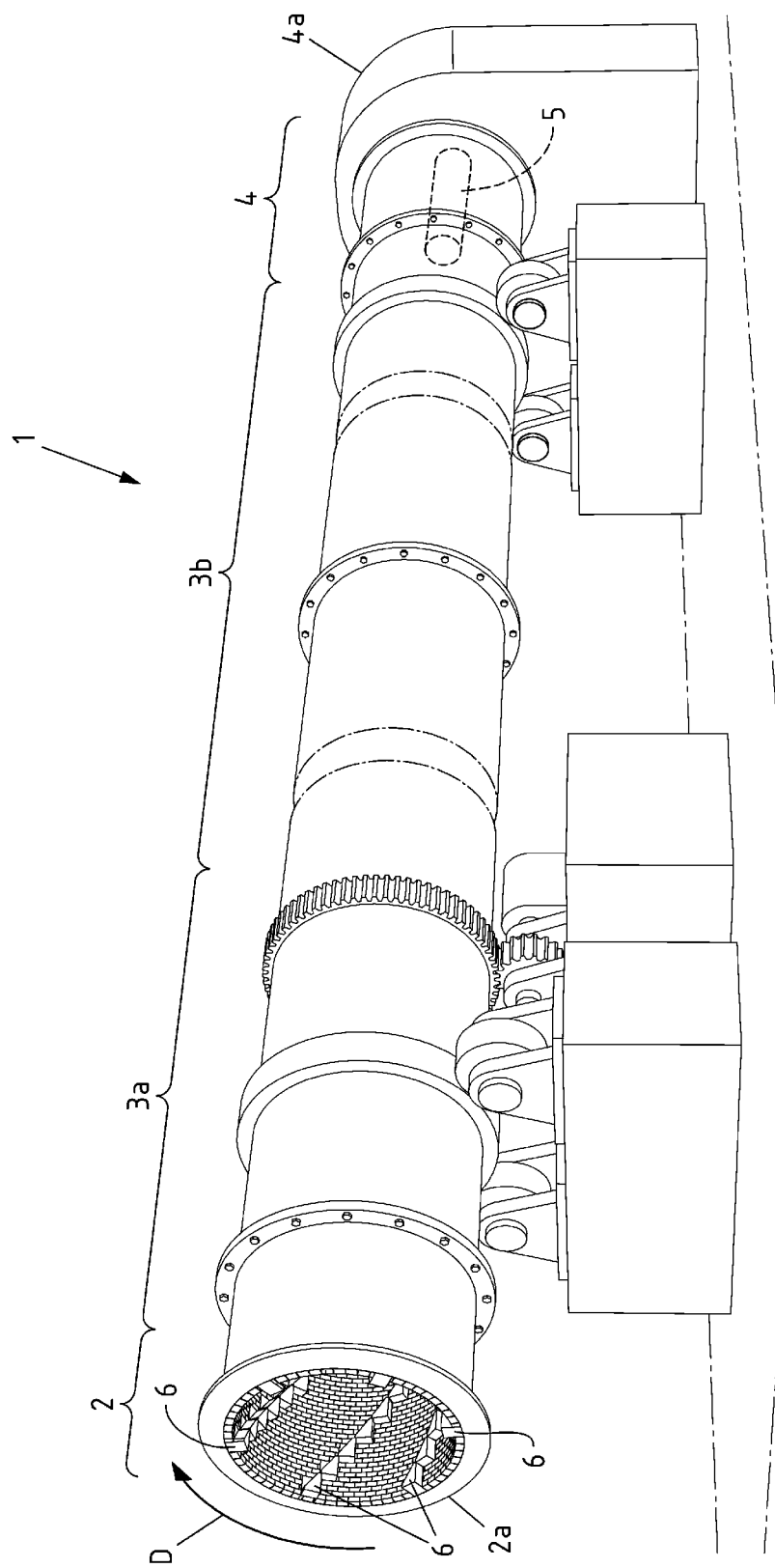
FIG. 1a the rotary tube of a rotary kiln with projections arranged in the inlet zone of the rotary tube for conveying the material to be burned from the inlet zone into the burning zone of the rotary tube in a perspective view, FIG. 1b a sectional enlargement of the rotary tube of FIG. 1a with partially cut-away kiln wall in a perspective view, FIG. 2 the projections in the inlet zone of the rotary tube of FIG. 1a, arranged in a row in a stepped form as groups, in a longitudinal perspective view according to FIG. 4, FIG. 3 a projection ("displacer") in the inlet zone of the rotary tube of FIG. 1a in a perspective view, FIG. 4 the rotary tube of FIG. 1a in a perspective longitudinal sectional view, FIG. 5 a number of further projections in the preheating zone of the rotary tube of FIG. 1a in a perspective longitudinal sectional view according to FIG. 4, FIG. 6 a further projection ("driver") in the preheating zone of the rotary tube of FIG. 1a in a perspective view, FIG. 7 the additional projections in the outlet zone of the rotary tube of FIG. 1a in a perspective longitudinal section view according to FIG. 4, FIG. 8 a further projection ("sword") in the outlet zone of the rotary tube of FIG. 4 in a perspective view.

In FIG. 1a, the rotary tube 1 of a rotary kiln is shown with conventional mounting and drive components, which will not be discussed in more detail below. The rotary tube 1 comprises an inlet end 2a— shown here at the front end— and an outlet end 4a at the back end. Along the longitudinal extension of the rotary tube 1, the rotary tube 1 comprises an inlet zone 2, a burning zone 3 and an outlet zone 4 with respect to the material feed, combustion and material discharge processes. As shown in FIG. 1a, but in particular in the partial sectional view of FIG. 1b and the longitudinal sectional view of FIG. 2, the rotary tube has 1 in its inlet zone 2 a plurality of projections 6, which have a specific shape and are arranged as groups 61 in a row in a stepped form, as will be described below. The projections 6 are also referred to in technical terms as "displacers."

Figure 1B:
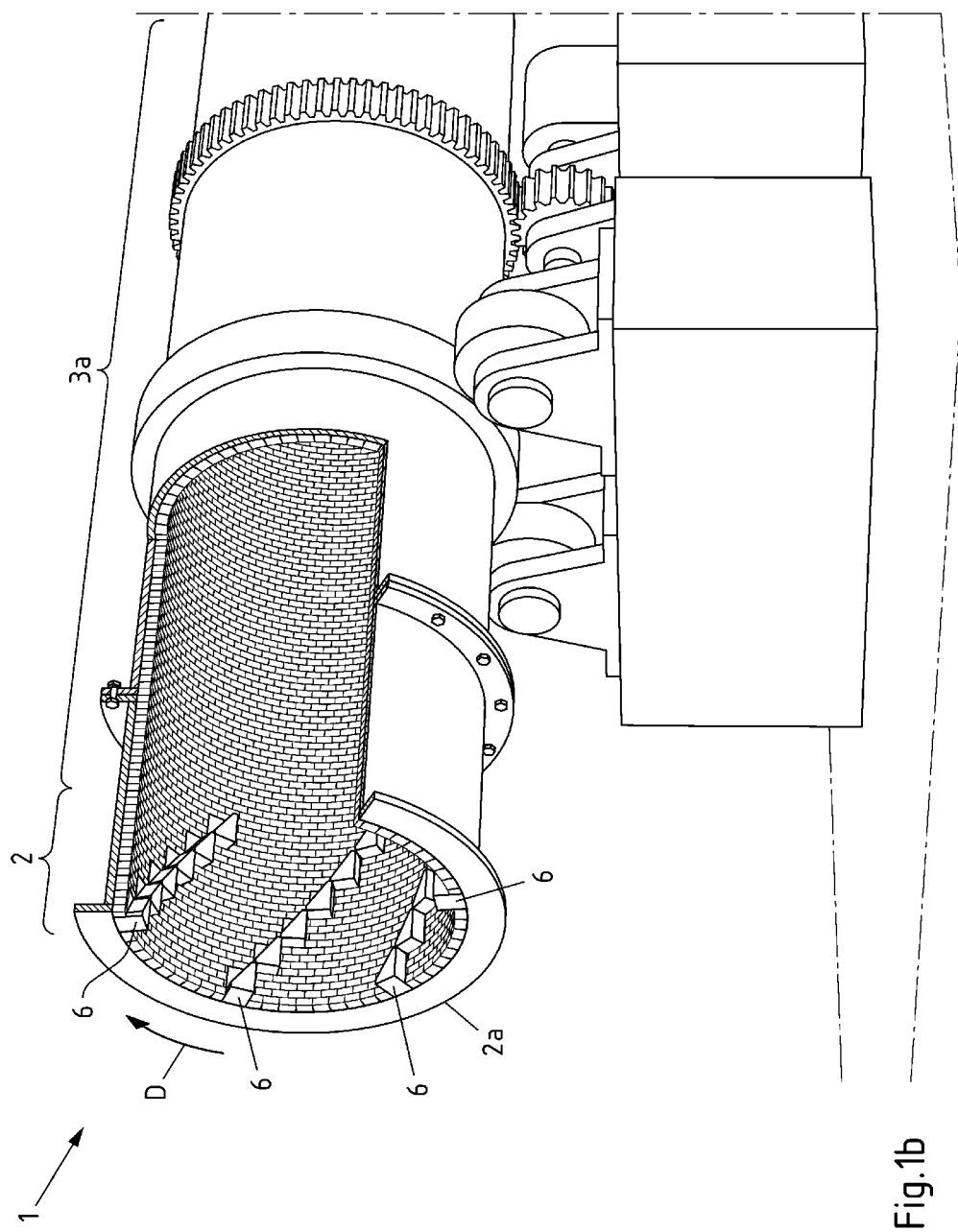
Figure 2:
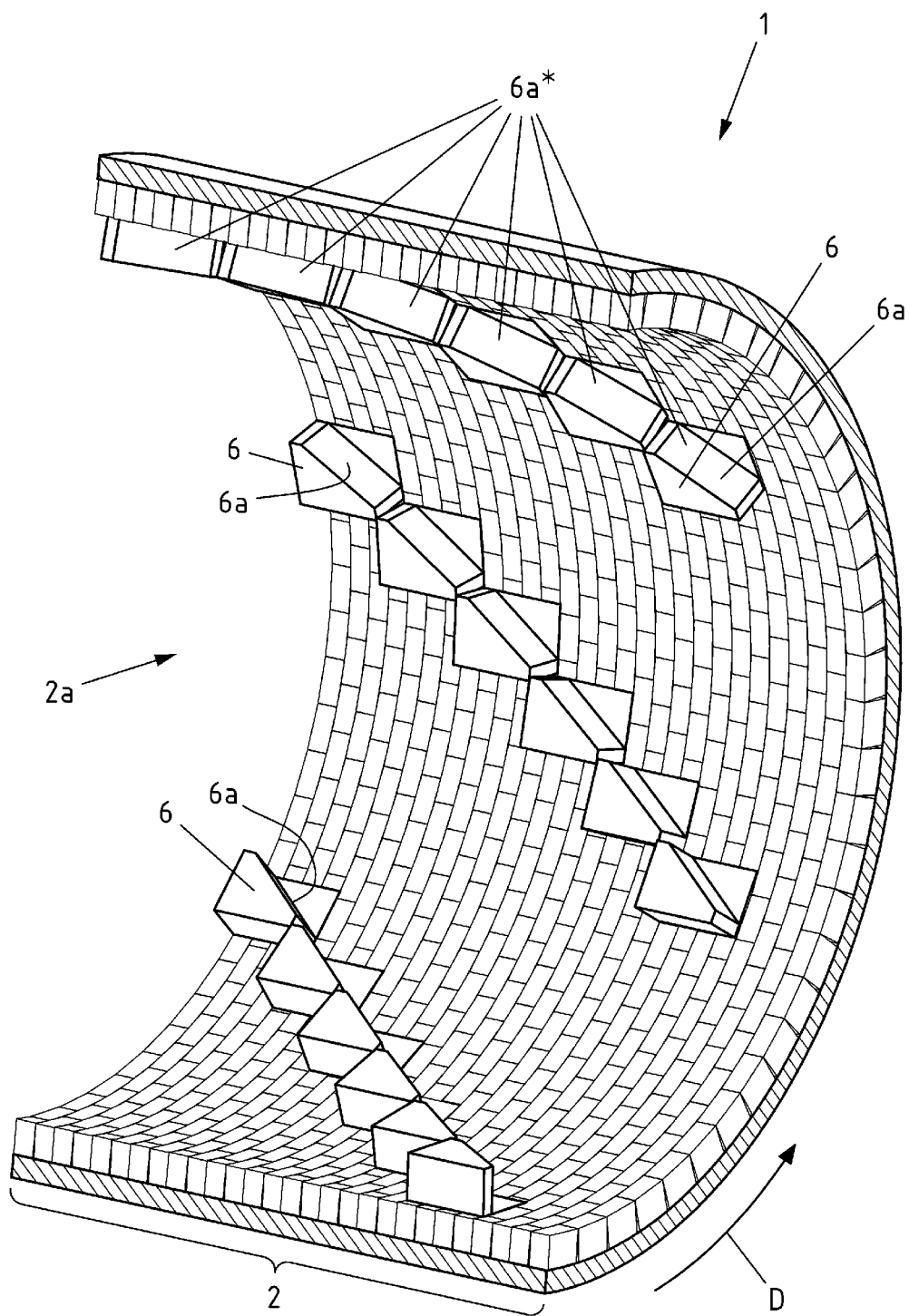
Figure 3:
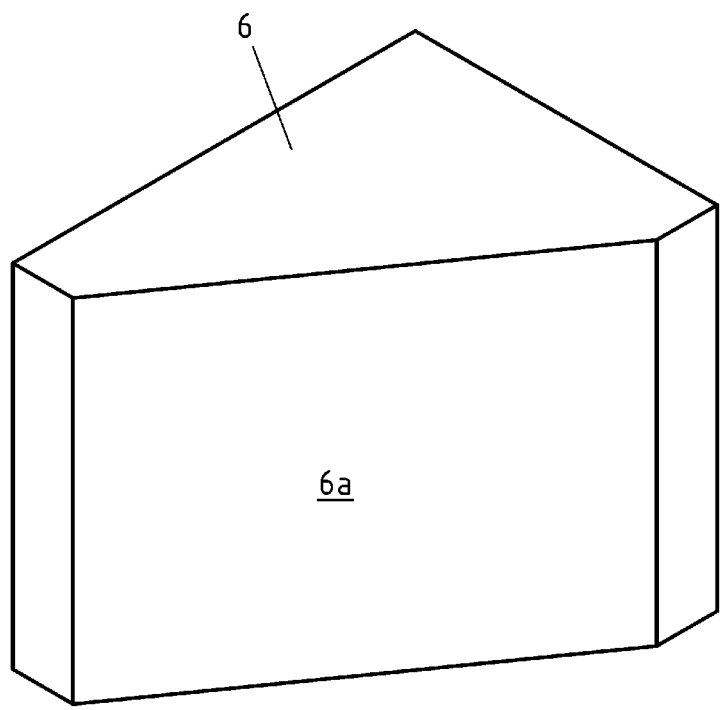

As shown in FIGS. 1a, 1b and 2, the projections 6 arranged as a group 61 of, in the present case, six projections arranged in a row are substantially identical to one another and, according to FIG. 3, in the present case have the shape of a straight prism with the base of a right isosceles triangle, the non-rectangular angles of the triangle being truncated.

Each projection 6 has a sliding surface 6a, which is arranged inclined to the longitudinal axis of the rotary tube 1. An angle of inclination of approximately 45° is preferably selected. As mentioned, the projections 6 are arranged in a row in a stepped form such that the individual sliding surfaces 6a of the projections 6 result in a common sliding surface 6a*, which in the present case is also inclined at an angle of approximately 45° to the longitudinal axis of the rotary tube 1.

Furthermore, the sliding surfaces 6a of the projections 6 or the common sliding surface 6a* of the projections 6 arranged in a row in groups are aligned relative to the direction of rotation D of the rotary tube 1 such that, during operation of the kiln, the material to be burned (not shown) comes to rest on the sliding surfaces 6a of the projections and, due to the selected inclination of the sliding surfaces 6a to the longitudinal axis of the rotary tube 1, slides quickly in the direction of the burning zone 3 by gravitational force.

As shown in FIG. 1a, a plurality of groups 61 of projections 6 arranged in a row in a stepped form are provided around the circumference on the inner wall of the rotary tube 1. In the present case, a number of six groups 61 is selected.

Figure 4:
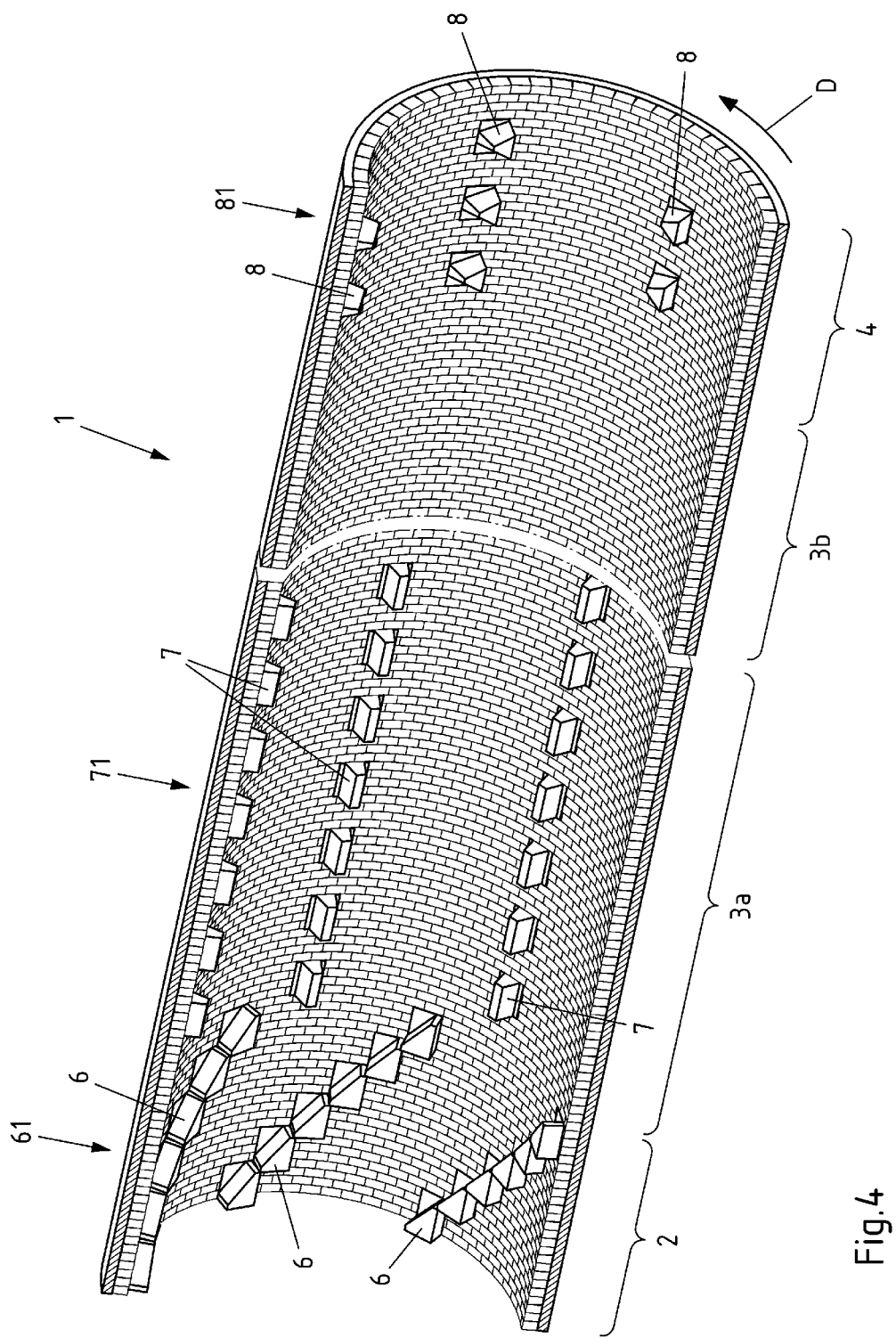
Figure 5:
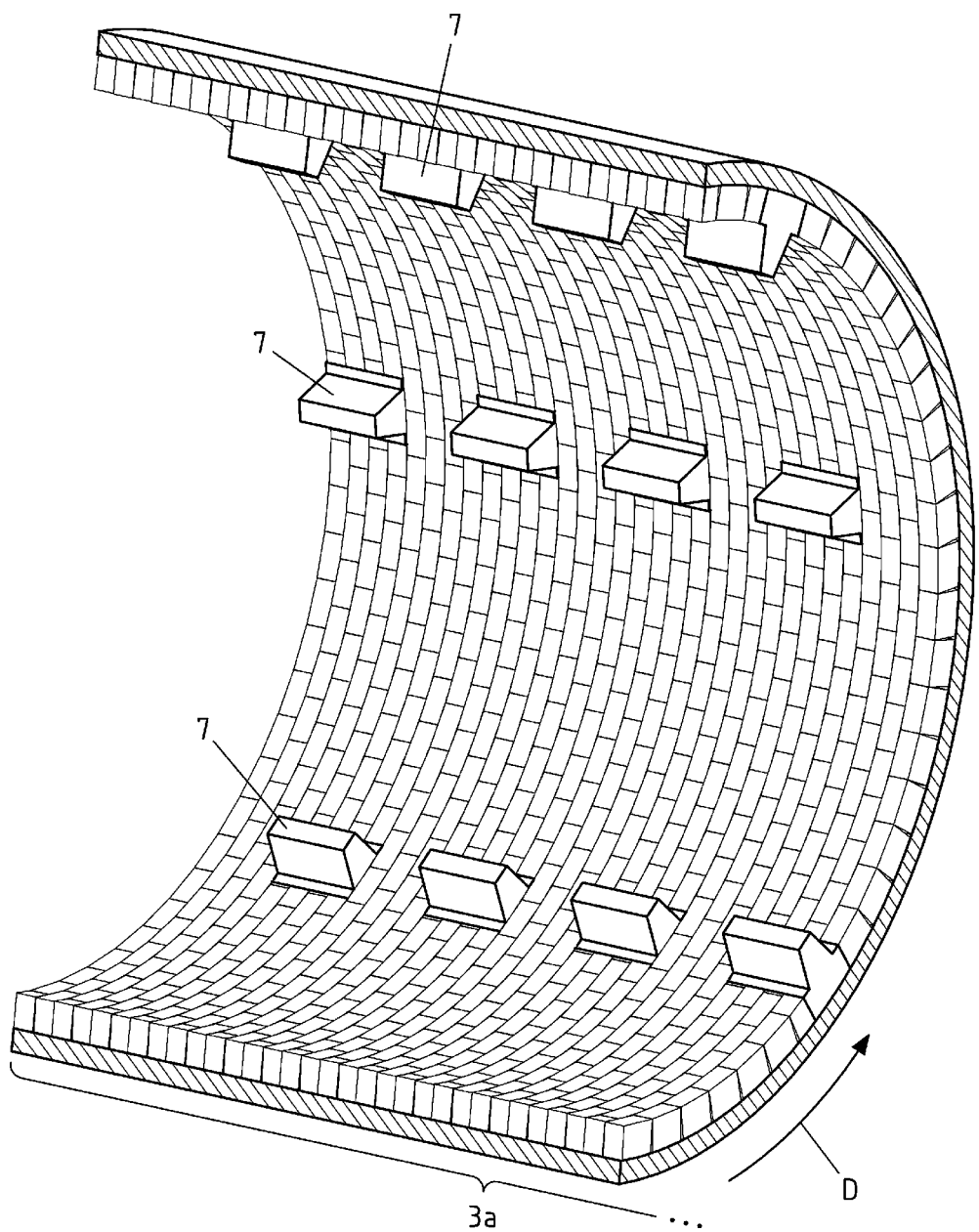
Figure 6:
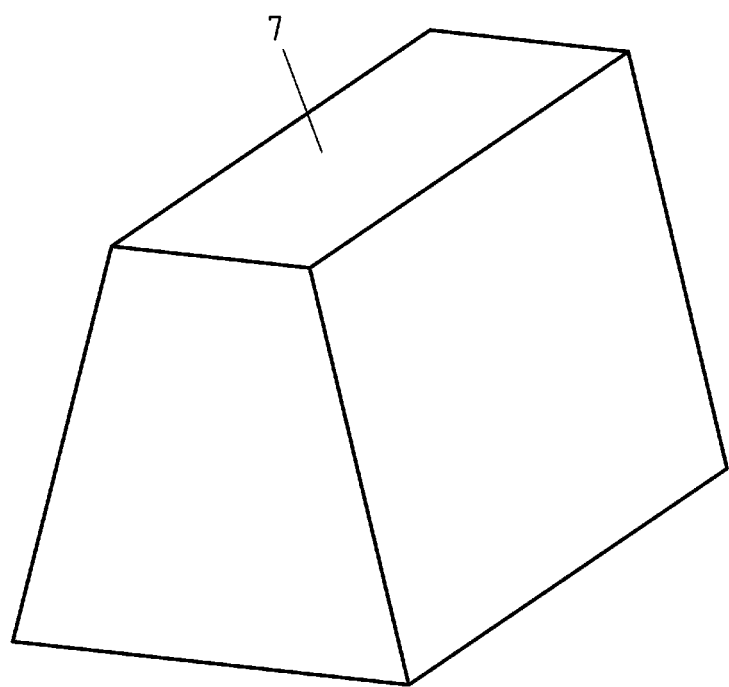
Figure 7:
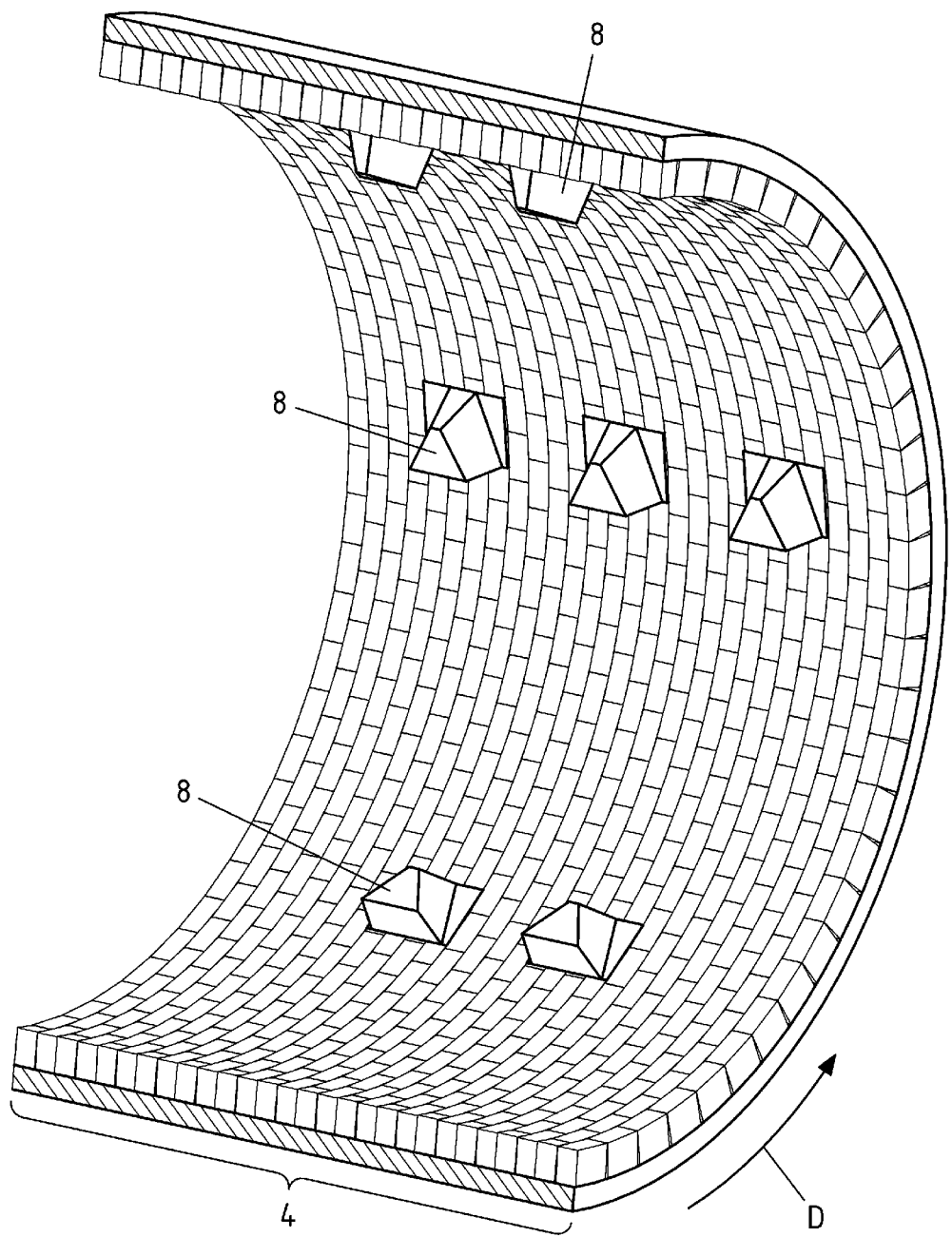
Figure 8:
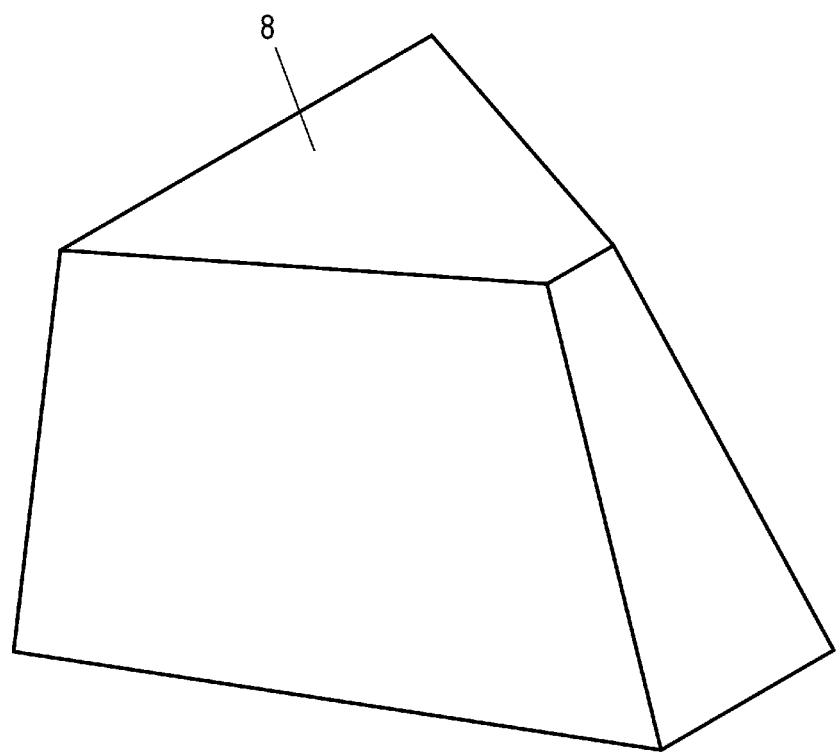

In the perspective longitudinal sectional view of the rotary tube 1 of FIG. 4, it is now shown that, in addition to the projections 6 provided in the inlet zone 2 of the rotary tube 1, further projections 7 (in technical terms, "drivers") may be provided in the preheating zone 3a. These serve to ensure that the material to be burned, which is now transported more rapidly through the inlet zone 2 as a result of the projections 6, is also transported quickly and with improved mixing through the preheating zone 3a, so that material build-up cannot occur, particularly in the region of the transition from the inlet zone 2 to the preheating zone 3a. They also serve to reduce the formation of dust in the preheating zone 3a. As shown in FIG. 6, these further projections 7 ("drivers") have the shape of a straight prism with the base of an isosceles trapezium, the trapezoidal surfaces being arranged perpendicular to the inner wall of the rotary tube 1. As can be seen further in FIG. 4, the further projections 7 are arranged as groups 71 parallel to the longitudinal axis of the rotary tube 1, the preheating zone 3a with the further projections 7 (and thus the rotary tube 1) not being shown in its full length in FIG. 4. For more clarity, a section of the preheating zone 3a with the further projections 7 is shown in FIG. 5. The relative arrangement of the individual groups 71 of the other projections 7 to one another and to the groups 61 of the projections 6 in the inlet zone is shown in particular in FIG. 9. Furthermore, FIG. 4 shows that a plurality of additional projections 8 are provided in the outlet zone 4 of the rotary tube 1, the additional projections 8 being arranged as groups 81 in the circumferential direction of the rotary tube 1 and offset from one another in the longitudinal direction of the rotary tube 1 in the process. These additional projections 8 (in technical terms, "swords") serve to prevent the formation of clusters in the burned material. As shown in FIG. 8, these additional projections 8 have the shape of a truncated pyramid with the base of an isosceles acute triangle, the acute angle leading in the direction of rotation of the rotary tube and being slightly truncated for stability reasons. For more clarity, the outlet zone 3 with the additional projections 8 is shown again in FIG. 7. The relative arrangement of the individual groups 81 of the additional projections 8 ("swords") to one another and to the groups 71 of the additional projections 7 ("drivers") in the inlet zone is shown in FIG. 9.

Figure 9:
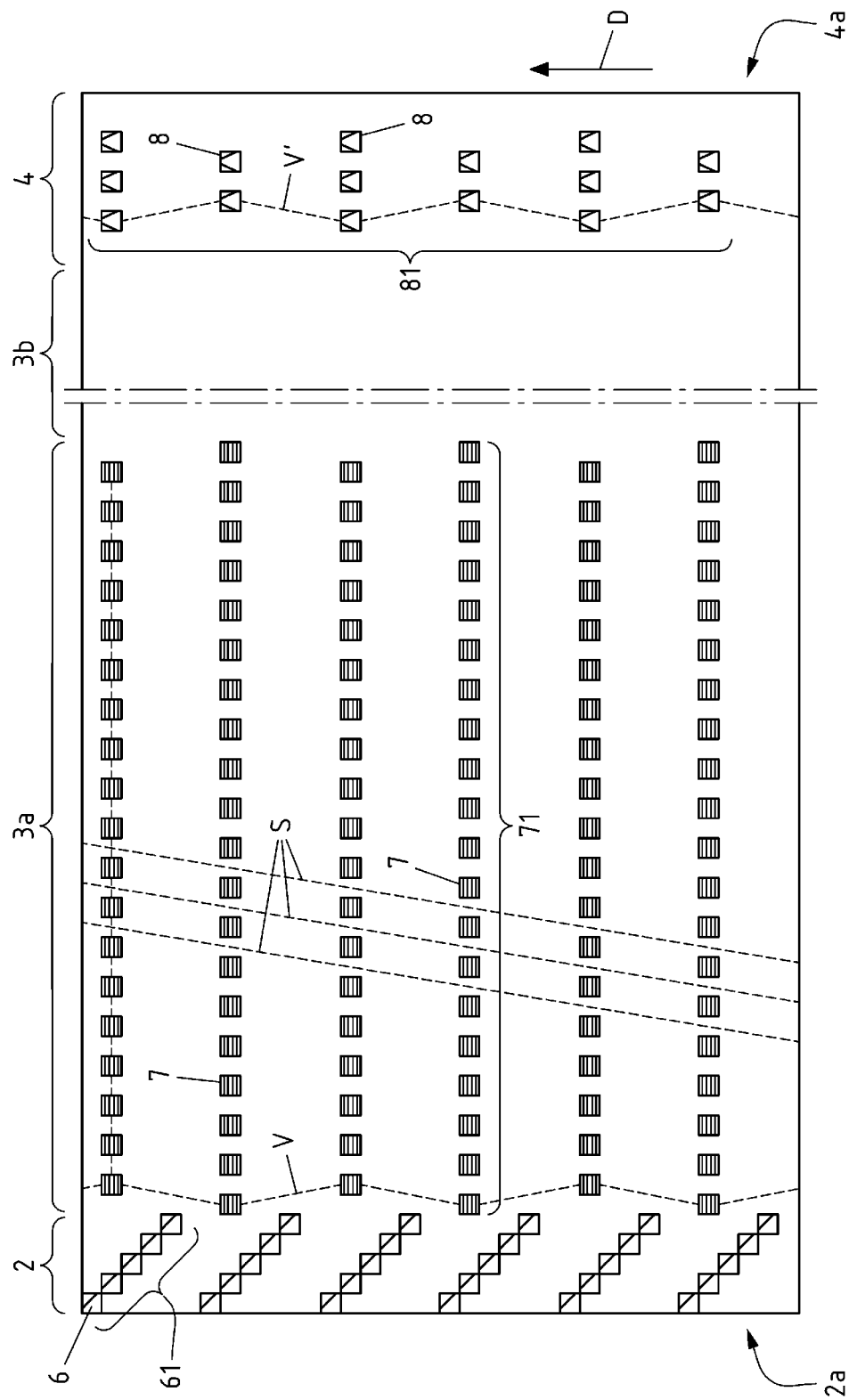
FIG. 9 two-dimensional representation of the "unrolled" inner wall of the rotary tube in highly schematized form.

FIG. 9 now shows in highly schematic form a representation of the "unrolled" inner kiln wall of the rotary tube. This means that the distribution of all the projections provided 6 ("displacers") in the inlet zone 6, further projections 7 ("drivers") in the preheating zone 3a and additional projections 8 ("swords") in the outlet zone 4 of the rotary tube 1 is shown in two-dimensional representation, the burning zone 3 again not being shown completely. Accordingly, six groups 61 each of five projections 6 ("displacers") arranged in a row in a stepped form are provided in the inlet zone 2 distributed over the circumference. In the preheating zone 3a adjoining the inlet zone 2, there are also six groups 71 of further projections 7 ("drivers") arranged one behind the other in the longitudinal direction of the rotary tube 1. Further projections 7 arranged adjacent to one another in the circumferential direction are positioned offset from one another, as shown by the auxiliary line V in FIG. 9. This offset arrangement results in spiral-shaped transport paths in the rotary tube 1, along which the material to be burned can move through the preheating zone 3a without obstruction. The spiral-shaped transport paths are shown by way of example in the two-dimensional representation of FIG. 9 as parallel lines S running diagonally.

Furthermore, FIG. 9 shows the additional projections 8 ("swords") provided in the outlet zone 4 of the rotary tube 1. As mentioned, these are arranged in groups 81 in the circumferential direction of the rotary tube 1, with the additional projections 8 of a group 81 being longitudinally offset from one another, in order to process a maximum amount of burned material. The offset in the longitudinal direction of the rotary tube 1 is shown in FIG. 9 by the auxiliary line V'. Two groups 81 of five additional projections 8 are provided. The group 81 arranged at the outlet end 4 of the rotary tube comprises only three additional projections 8. In contrast to the projections 6 of the inlet zone 2, the additional projections 8 do not extend to the outlet end 4a of the rotary tube 1. Rather, a certain distance of preferably approximately 1 m can be selected.

The invention claimed is:

1. A rotary kiln for burning carbonate-containing material comprising:
    a rotary tube comprising:
        an inlet end for feeding of material to be burned;
        an outlet end for discharging of burned material;
        an inlet zone at the inlet end;
        an outlet zone at the outlet end; and
        a preheating zone and a burning zone arranged between the inlet zone and outlet zone,
    wherein a plurality of projections are provided in the inlet zone of the rotary tube, each projection of the plurality of projections having at least one sliding surface inclined to a longitudinal axis of the rotary tube for conveying the material to be burned from the inlet zone into the burning zone, and
    wherein the plurality of projections are arranged in a row as a group in such a way that respective sliding surfaces of the projections form a common sliding surface for the material to be burned.

2. The rotary kiln according to claim 1, wherein the at least one sliding surface of at least one of the plurality of projections has an inclination to the longitudinal axis of the rotary tube from 15° to 70°.

3. The rotary kiln according to claim 1, wherein at least one of the plurality of projections contains a refractory material, the refractory material being concrete.

4. The rotary kiln according to claim 1, wherein at least one of the plurality of projections has a prismatic geometry.

5. The rotary kiln according to claim 1, wherein at least one of the plurality of projections has a height extending in a radial direction of the rotary tube of 100 mm to 500 mm,
and/or at least one of the plurality of projections has a length extending substantially parallel to the longitudinal axis of the rotary tube of 100 mm to 2000 mm,
and/or at least one projection of the plurality of projections is attached by metallic anchoring to an inner side of the rotary tube.

6. The rotary kiln according to claim 1, wherein the common sliding surface formed by the plurality of projections extends substantially over an entire length of the inlet zone.

7. The rotary kiln according to claim 6, wherein the common sliding surface for the material to be burned is provided by 3 to 9 projections.

8. The rotary kiln according to claim 6, wherein the plurality of projections are formed substantially identically to one another, such that a common sliding surface is formed with a substantially constant slope,
and/or the plurality of projections are arranged in rows in a stepped form as a group along the inlet zone.

9. The rotary kiln according to claim 1, wherein 2 to 8 projections or groups of projections are arranged in the row over a circumference of the rotary tube.

10. The rotary kiln according to claim 1, wherein the rotary tube has at least one further projection in the preheating zone.

11. The rotary kiln according to claim 1, wherein a plurality of further projections are provided in the preheating zone, the further projections being arranged as groups substantially parallel to the longitudinal axis of the rotary tube, wherein, optionally, the further projections arranged adjacent to one another in a circumferential direction, each belonging to adjacent groups of further projections, are arranged offset from one another in the longitudinal direction of the rotary tube in such a way that spiral-shaped transport paths are formed for the material to be burned.

12. The rotary kiln according to claim 1, wherein the rotary tube has at least one additional projection in the outlet zone, in order to prevent the formation of clusters in the burned material.

13. The rotary kiln according to claim 1, wherein a plurality of additional projections are provided in the outlet zone, the additional projections being arranged as groups in a circumferential direction of the rotary tube.

14. A method for burning carbonate-containing material comprising:
introducing the carbonate-containing material into the rotary tube of a rotary kiln according to claim 1,
burning the carbonate-containing material, the carbonate-containing material moving through the rotary tube from the inlet zone and the burning zone to the outlet zone, the rotary tube rotating in a direction of rotation, and
conveying the carbonate-containing material from the inlet zone into the preheating zone, in that the carbonate-containing material rests at least partially on the common sliding surface of the plurality of projections, which is inclined to the longitudinal axis of the rotary tube, and slides, driven by gravity, in a direction of the preheating zone.

15. The rotary kiln according to claim 1, wherein at least one of the plurality of projections is a straight prism with a triangular base.

16. The rotary kiln according to claim 1, wherein at least one of the plurality of projections has a height extending in a radial direction of the rotary tube of 140 mm to 400 mm,
and/or at least one of the plurality of projections has a length extending substantially parallel to the longitudinal axis of the rotary tube of 150 mm to 1000 mm,
and/or at least one projection of the plurality of projections is attached by a welded metallic anchoring to an inner side of the rotary tube.

17. The rotary kiln according to claim 6, wherein the common sliding surface for the material to be burned is provided by 4 to 8 projections.

18. The rotary kiln according to claim 1, wherein 3 to 7 projections or groups of projections are arranged in the row over a circumference of the rotary tube.

19. The rotary kiln according to claim 1, wherein a plurality of additional projections are provided in the outlet zone, the additional projections being arranged as groups in a circumferential direction of the rotary tube and offset from one another in the longitudinal direction of the rotary tube.

20. The rotary kiln according to claim 1, wherein there are substantially no gaps between individual projections of the plurality of projections in the row, such that the common sliding surface is substantially continuous.

* * * * *